(12) United States Patent
Shimizu et al.

(10) Patent No.: US 9,598,135 B2
(45) Date of Patent: Mar. 21, 2017

(54) COWL OF SADDLE-RIDDEN TYPE VEHICLE

(71) Applicant: SUZUKI MOTOR CORPORATION, Hamamatsu-shi, Shizuoka (JP)

(72) Inventors: Yuki Shimizu, Hamamatsu (JP); Yoshihisa Nakayama, Hamamatsu (JP)

(73) Assignee: SUZUKI MOTOR CORPORATION, Hamamatsu-Shi (JP)

( * ) Notice: Subject to any disclaimer, the term of this patent is extended or adjusted under 35 U.S.C. 154(b) by 0 days.

(21) Appl. No.: 14/860,533

(22) Filed: Sep. 21, 2015

(65) Prior Publication Data

US 2016/0090144 A1  Mar. 31, 2016

(30) Foreign Application Priority Data

Sep. 29, 2014  (JP) .................................. 2014-198339

(51) Int. Cl.
*B62K 19/48* (2006.01)

(52) U.S. Cl.
CPC .................................... *B62K 19/48* (2013.01)

(58) Field of Classification Search
CPC ... B62J 17/00; B62J 17/04; B62J 17/02; B62J 17/06; B62J 99/00; B62J 23/00; B62J 15/00; B62J 2099/0086
USPC .... 180/219, 229, 68.3, 68.1; 296/78.1, 37.1, 296/180.1, 208, 91, 96.21, 29, 92, 75
See application file for complete search history.

(56) References Cited

U.S. PATENT DOCUMENTS

| 4,703,825 A | * | 11/1987 | Mikami | B62J 17/00 123/41.7 |
| 5,330,029 A | * | 7/1994 | Yoshimura | B62J 17/00 180/219 |
| 7,137,722 B2 | * | 11/2006 | Uemoto | B60Q 1/007 362/373 |
| 8,464,823 B2 | | 6/2013 | Miyazaki et al. | 180/219 |
| 2009/0108629 A1 | * | 4/2009 | Takahashi | B62K 11/04 296/192 |
| 2009/0178870 A1 | * | 7/2009 | Takahashi | B62J 3/00 180/229 |
| 2009/0250963 A1 | * | 10/2009 | Nakamura | B62J 17/06 296/78.1 |
| 2012/0043150 A1 | | 2/2012 | Miyazaki et al. | 180/229 |

(Continued)

FOREIGN PATENT DOCUMENTS

JP  2012-162094 A  8/2012

*Primary Examiner* — Glenn Dayoan
*Assistant Examiner* — Sunsurraye Westbrook
(74) *Attorney, Agent, or Firm* — Stein IP, LLC

(57) ABSTRACT

A cowl which covers a front component of a saddle-ridden type vehicle, includes: a cowl body; and passage forming portions each of which extends from a front, central, in a left-right direction, position of the cowl body or a vicinity of the front, central position to a side position of the cowl body; each of the passage forming portions forms an air passage that extends from the front, central position of the cowl body or a vicinity of the front, central position to the side position of the cowl body; the passage forming portions or each of the passage forming portions has an inlet as defined herein; each of the passage forming portions has an outlet as defined herein; and the air passages cause a riding wind occurring during running of the saddle-ridden type vehicle to flow through the air passages.

20 Claims, 11 Drawing Sheets

(56) References Cited

U.S. PATENT DOCUMENTS

2013/0249239 A1* 9/2013 Yokouchi ................ B62J 17/00
 296/180.1
2014/0225398 A1* 8/2014 Mikura ..................... B62J 6/02
 296/192

* cited by examiner

COWL OF SADDLE-RIDDEN TYPE VEHICLE

FIELD OF THE INVENTION

The present invention relates to a cowl as a front component of a saddle-ridden type vehicle.

BACKGROUND OF THE INVENTION

A cowl (cowling) as a front component of saddle-ridden type vehicles (e.g., motorcycles) has such roles as direction-adjusting a riding wind (i.e., a flow of air around the saddle-ridden type vehicle that is running), protecting the rider from a riding wind, and improving the design of the saddle-ridden type vehicle (refer to JP-A-2012-162094, for example).

Increase of the cowl size can enhance, for example, the effect of protecting the rider from a strong riding wind that he or she receives during a high-speed ride and the effect of reducing the degree of fatigue that the rider suffers due to continued reception of riding winds during a long-time ride. In the case of vehicle types such as a tourer, a racer replica, and a super sport type, increase of the cowl size may be able to improve the appearance or create an individualistic design.

SUMMARY OF THE INVENTION

Whereas as mentioned above increase of the cowl size may be able to provide the advantage of protecting the rider from a riding wind more effectively or improving the design, it is associated with a problem that the air drag occurring at the time of riding is increased.

A phenomenon is known that after hitting the cowl a riding wind is split into side winds that flow alongside (outside) the cowl and then parts of these side winds turn inward to reach the back side of the cowl, that is, go toward the center, in the left-right direction (width direction), of the saddle-ridden type vehicle. The winds that have reached the back side of the cowl may hit the belly of the rider. It is desirable to weaken such parts, hitting the belly of the rider, of a riding wind because they may cause the rider feel uncomfortable or increase his or her fatigue. However, there is a problem that it is difficult to weaken such parts of a riding wind merely by increasing the size of the cowl.

JP-A-2012-162094 discloses side cowls to be installed in a motor cycle. The side cowls are disposed beside a front cowl. Each of the side cowls has a riding wind passage for preventing a strong riding wind or mud from hitting the rider while suppressing increase of air drag. More specifically, each side cowl is equipped with a first cowl and a second cowl. The first cowl covers a head pipe of the motorcycle and its associated front fork from the side. The second cowl is disposed outside portions of the first cowl that are located outside the head pipe and the front fork in the left-right direction. A riding wind passage is formed between the first cowl and the second cowl. JP-A-2012-162094 states that by causing parts of a riding wind to pass through the riding wind passages increase of air drag can be suppressed and the driver can be prevented from being hit by a strong riding wind or mud.

However, the side cowls of JP-A-2012-162094 have the following problems. In each of the side cowls of JP-A-2012-162094, an inlet of the riding wind passage is disposed at a position that is deviated sideways from the center, in the left-right direction, of a front portion of the front cowl. The pressure that a riding wind coming from the front side of the motor cycle imposes in hitting the front cowl or one of the side cowl is highest at the center, in the left-right direction, of the front portion of the front cowl and decreases as the position goes sideways from there. Therefore, a sufficient part of a riding wind may not flow into the riding wind passage through the inlet of each side cowl which is deviated sideways from the center, in the left-right direction, of the front portion of the front cowl.

In each of the side cowls of JP-A-2012-162094, an outlet of the riding wind passage is formed so as to be directed to the side in the rear of the motorcycle, as a result of which a riding wind that has passed through the riding wind passage flows out rearward (i.e., away from the side cowl) from the outlet. With this structure, it is impossible to change the direction of a riding wind flowing alongside (outside) the side cowl so that it goes sideways away from the side cowl, by means of a riding wind that flows out of the outlet. This means that a riding wind that hits the belly of the rider may not be weakened sufficiently.

Furthermore, in each of the side cowls of JP-A-2012-162094, it is configured in such a manner that the second cowl is disposed outside the first cowl, it becomes large as a whole in the left-right direction. This restricts the degree of freedom of designing of the entire cowl, that is, the front cowl plus the side cowls, and makes it difficult to create a good cowl design.

The present invention has been made in view of, for example, the above problems, and a first object of the invention is to provide a cowl capable of suppressing increase of air drag even if it is increased in size and weakening a riding wind that hits the belly of the rider.

A second object of the invention is to provide a cowl capable of suppressing increase of air drag and weakening a riding wind that hits the belly of the rider while securing a high degree of cowl designing.

The invention is directed to a cowl which covers a front component of a saddle-ridden type vehicle, comprising: a cowl body; and passage forming portions each of which extends from a front, central, in the left-right direction, position of the cowl body or a vicinity of the front, central position to a side position of the cowl body, wherein each of the passage forming portions forms an air passage that extends from the front, central position of the cowl body or its vicinity to the side position of the cowl body; the passage forming portions or each of them has an inlet that is opened at the front, central position of the cowl body or a position near the front, central position so as to face the side in front of the cowl body; each of the passage forming portions has an outlet that is opened at a side position of the cowl body so as to face the side on the rear-left or rear-right of the cowl body; and the air passages cause a riding wind occurring during running of the saddle-ridden type vehicle to flow through themselves.

In the cowl having the above configuration, since the inlets are formed in regions where a riding wind hits the cowl body at a high pressure, the amounts of riding wind flowing through the air passages can be increased and the air resistance of the cowl can be reduced. Furthermore, parts of a riding wind that have flown through the air passages are allowed to flow out of the outlets which are formed at the side positions of the cowl body, whereby formation of riding wind vortices beside the cowl can be suppressed and vortices formed beside the cowl can be blown rear-leftward or rear-rightward away from the cowl. Thus, a riding wind that hits the belly of the rider can be weakened.

In the above-recited invention, it is preferable that the cowl body has curved portions each of which extends between a front portion or a front edge and a side end portion or side end of the cowl body while being curved so as to be convex outward and partially defines the associated air passage.

This makes it possible to reduce air drag and weaken a riding wind that hits the belly of the rider while securing a high degree of cowl designing.

Furthermore, in the above-recited invention, it is preferable that the air passages are inclined with respect to a front-rear reference line, located at the center in the left-right direction, of the saddle-ridden type vehicle in an approximately horizontal sectional view.

With this measure, the air passages can guide a riding wind to beside the cowl smoothly.

Furthermore, in the above-recited invention, it is preferable: that the cowl body has, at the front, central position, a projection portion which projects forward; that the inlets are located near the projection portion; and that the cowl body has slant surfaces each of which extends from the projection portion to the inlet and is inclined gently so as to go rearward as the position goes from the projection portion to the inlet.

With this measure, not only do parts of a riding wind flow into the air passages directly through the inlets but also another part of the riding wind that hits the front, central portion of the cowl body flow into the air passages through the inlets after flowing alongside the slant surfaces. Gathered in this manner, a larger amount of riding wind can be introduced into the air passages through the inlets.

Furthermore, in the above-recited invention, it is preferable that the outlets are located higher than the inlets.

Usually, cowls are disposed on the bottom-front side of the belly of the driver. With this measure, parts of a riding wind that have flown through the air passages are allowed to flow out to beside the cowl and flow toward regions beside the belly of the rider. Thus, the effect of weakening a riding wind hitting the belly of the rider can be enhanced.

Furthermore, in the above-recited invention, it is preferable that each of the passage forming portions has a narrowing portion which makes the sectional area of the air passage smaller as the position goes from the inlet to the outlet.

This makes it possible to increase the flowing speed of riding winds flowing out of the outlets.

Furthermore, in the above-recited invention, it is preferable that each of the passage forming portions has a hole which causes an intermediate portion of the air passage to communicate with the inside of the cowl body.

This makes it possible to reduce the negative pressure inside the cowl body and to dispose the holes at such positions as to be hardly seen or not to be seen at all from the outside.

The invention makes it possible to suppress increase of air drag even if the cowl is increased in size and to weaken a riding wind that hits the belly of the rider even if the cowl is decreased in size. Furthermore, the invention makes it possible to suppress increase of air drag and weaken a riding wind that hits the belly of the rider while securing a high degree of cowl designing.

DESCRIPTION OF SYMBOLS

Figure 1:
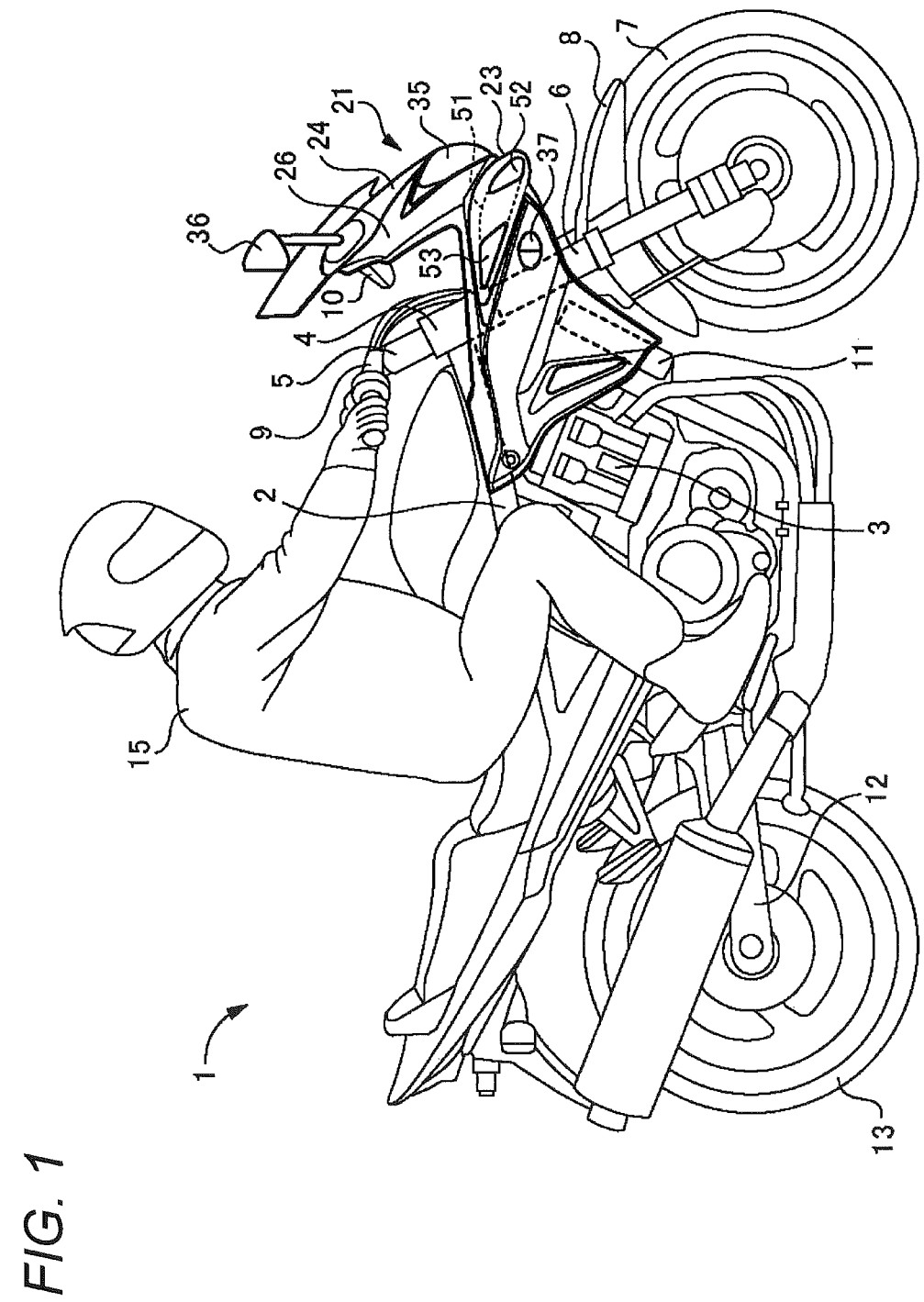
FIG. 1 shows a motorcycle that is equipped with a cowl according to a first embodiment of the present invention.

1: Motorcycle
4: Head pipe
10: Meter unit
11: Radiator
15: Rider
21, 61, 71, 81: Cowl
22, 91: Cowl body
23, 72, 82: Front member
24: Top member
25: Left side member
26: Right side member
27: Lower edge member
31: Wind screen
35: Headlamp
41: Outer member
42: Inner member
43: Projection portion
44, 45: Curved portion
46: Slant surface
47, 48: Passage forming portion
51, 74, 85, 95: Air passage
52, 73, 86, 92: Inlet
53, 87, 93: Outlet
54: Narrowing portion
62: Hole
83: Recess
84: Cover plate
94: Passage member

DETAILED DESCRIPTION OF THE INVENTION

Embodiments of the present invention will be hereinafter described with reference to the drawings. In the description of the embodiments, the forward, rearward, leftward, and rightward directions are defined with the rider of a motor cycle as a reference.

FIG. 1 shows a motorcycle 1 as a specific example of a saddle-ridden type vehicle. As shown in FIG. 1, the motorcycle 1 is equipped with a body frame 2 which supports an engine 3. A head pipe 4 is fixed to the front end of the body frame 2 and a steering shaft 5 is supported by the head pipe 4. Front forks 6 are attached to the steering shaft 5 and a front wheel 7 is supported by the front forks 6. A front fender 8 is fixed to bottom portions of the front forks 6 so as to cover the front wheel 7 from above. A handlebar 9 is attached to the top of the steering shaft 5. A meter unit 10 is disposed in front of the handlebar 9 and is equipped with display devices of a speedometer, a tachometer, etc. A radiator 11 is attached to the body frame 2 in front of the engine 3. On the other hand, a swing arm 12 is connected to the rear end of the body frame 2 and a rear wheel 13 is supported by the swing arm 12.

A cowl 21 according to the first embodiment of the invention is provided as a front component of the motorcycle 1. In this embodiment, the cowl 21 is a half cowl that covers only a top-front part of the motorcycle 1 and is fixed to a front portion of the body frame 2.

Figure 2:
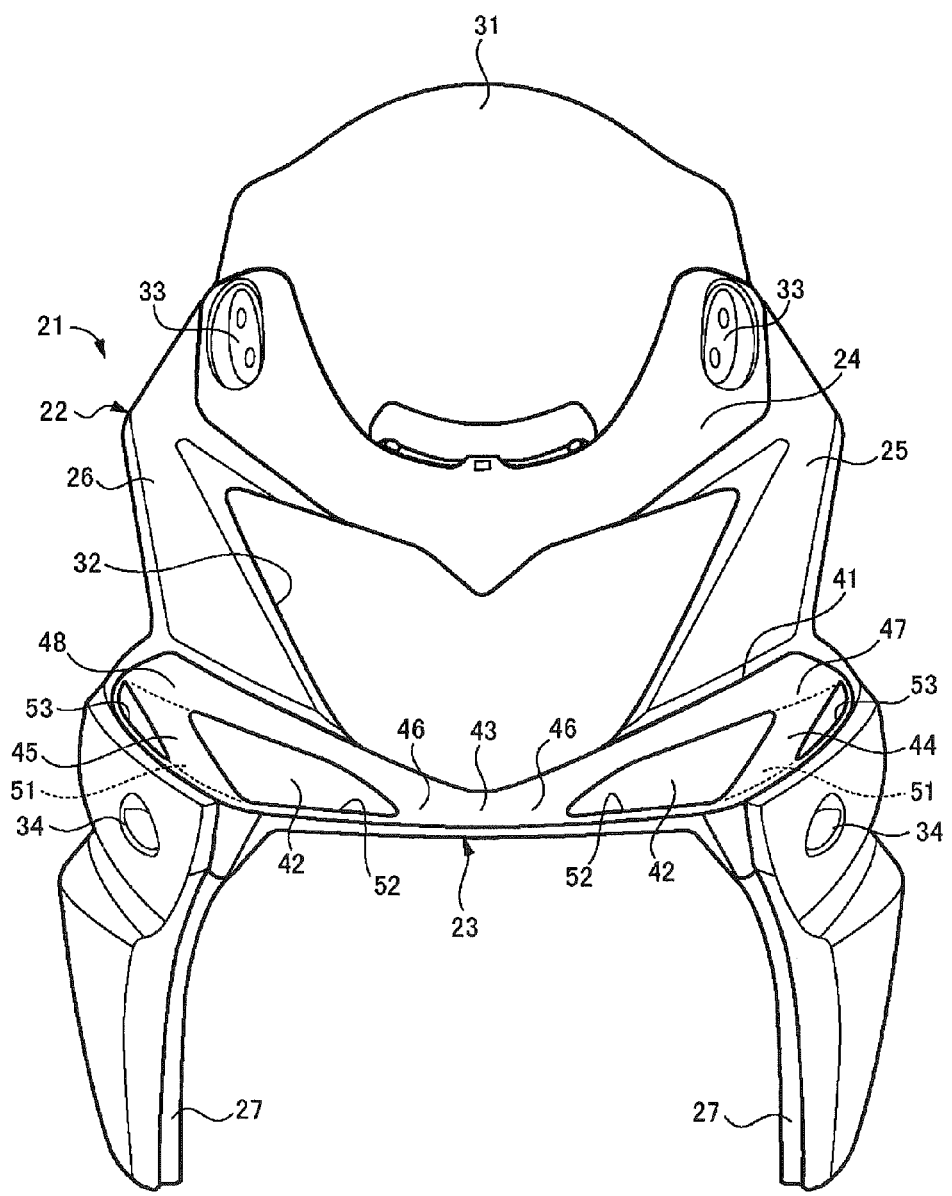
FIG. 2 is a front view of the cowl according to the first embodiment.
Figure 3:
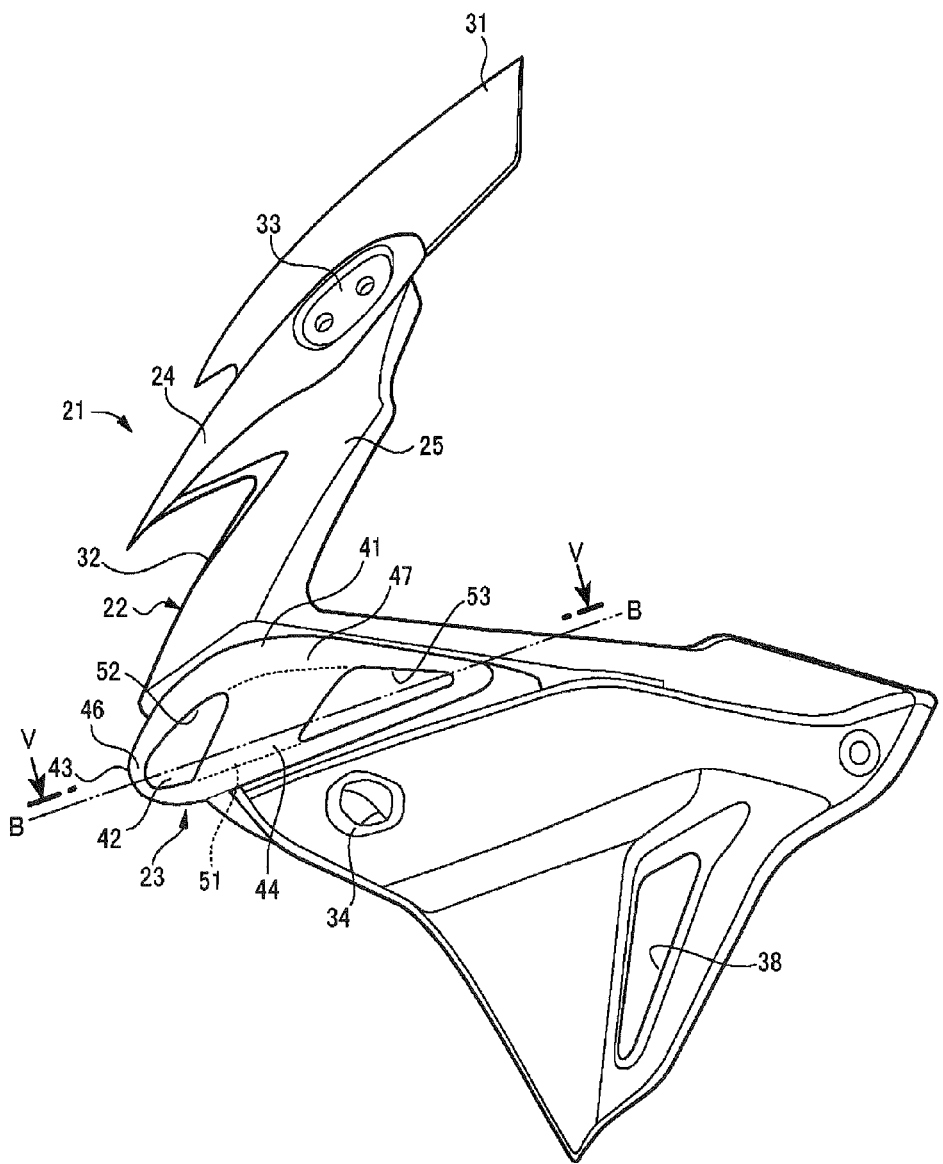
FIG. 3 is a side view of the cowl according to the first embodiment.
Figure 4:
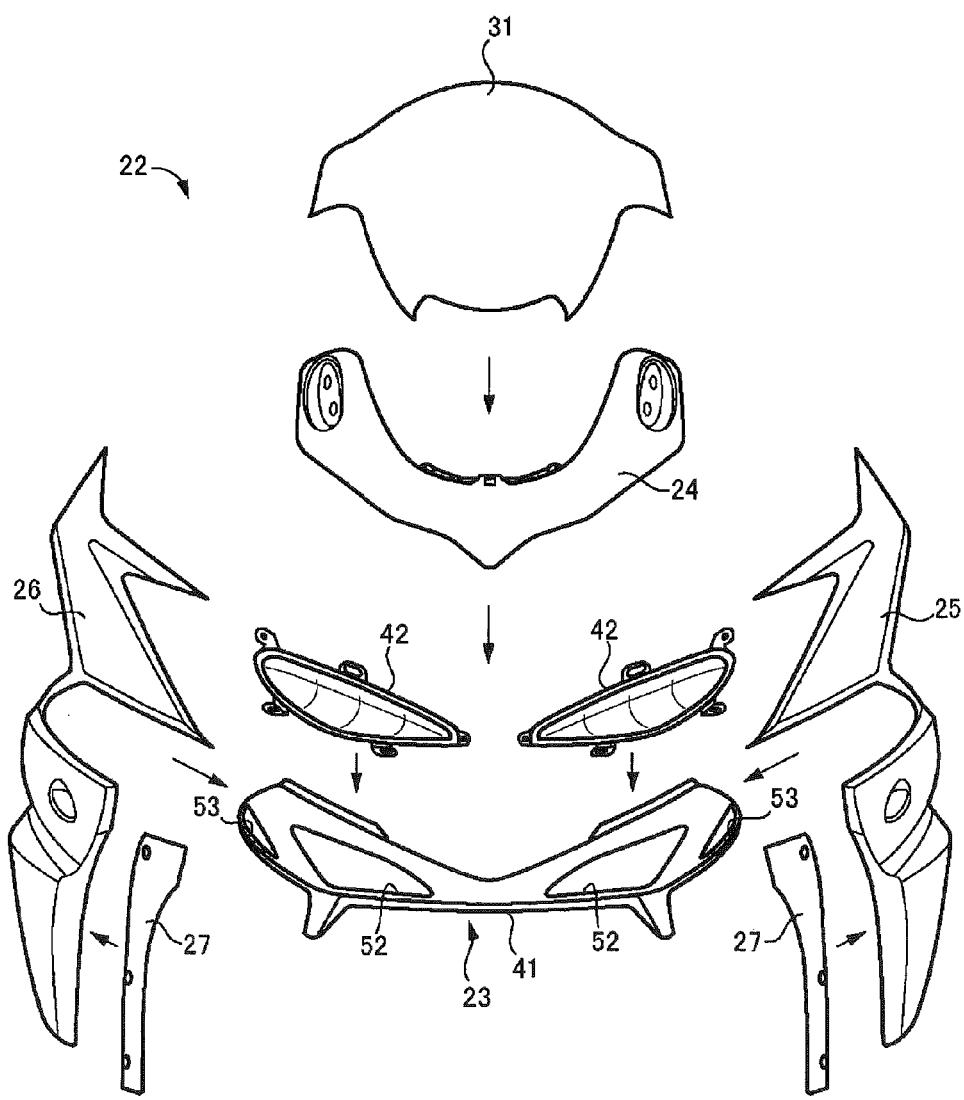
FIG. 4 is an exploded view of the according to the first embodiment.
Figure 5:
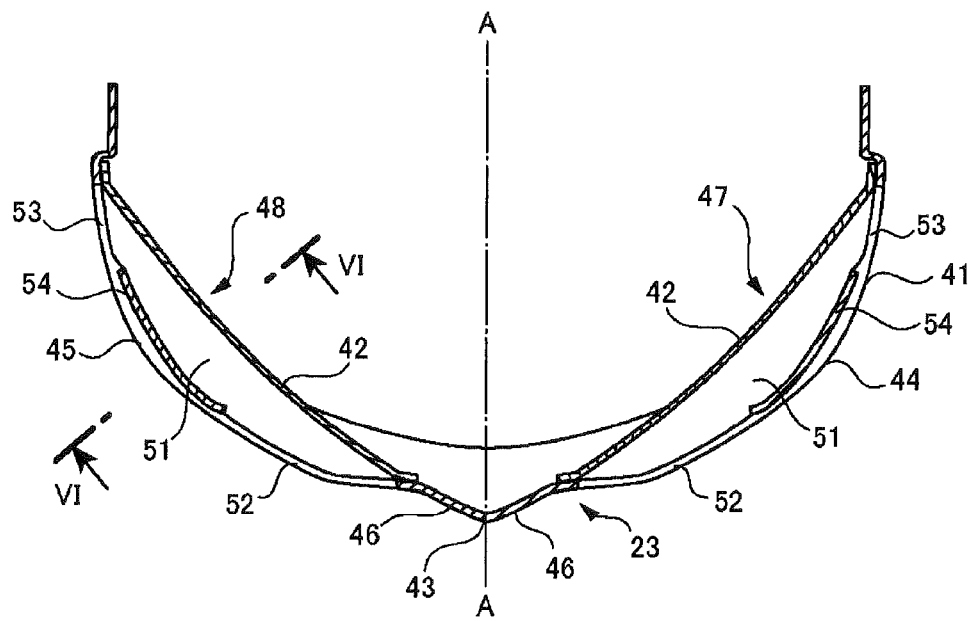
FIG. 5 is a sectional view of a front member taken along line V-V in FIG. 3 (and viewed from the arrowed direction).
Figure 6:
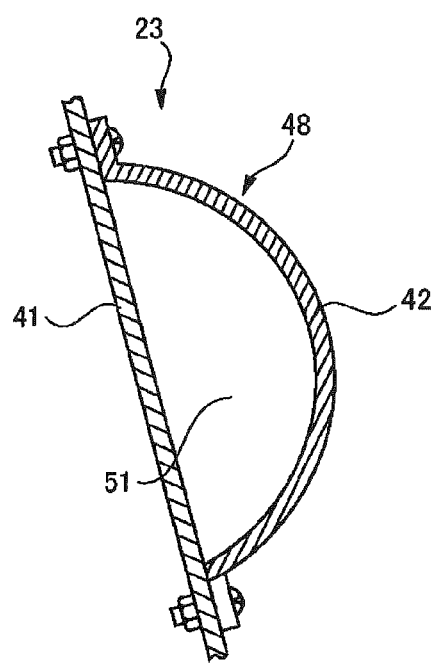
FIG. 6 is a sectional view of the front member taken along line VI-VI in FIG. 5 (and viewed from the arrowed direction).

FIGS. 2-6 show the cowl 21. FIGS. 2-4 are a front view, a side view, and an exploded view of the cowl 21, respectively. FIG. 5 is a sectional view of a front member 23 of the cowl 21 taken along line V-V in FIG. 3 (and viewed from the arrowed direction). FIG. 6 is a sectional view of the front member 23 taken along line VI-VI in FIG. 5 (and viewed from the arrowed direction).

As shown in FIG. 2, a cowl body 22 of the cowl 21 has the front member 23 which is a front part of the cowl body 22, a top member 24 which is a top part of the cowl body 22, a left side member 25 which is a left part (shown on the right side in FIG. 2) of the cowl body 22, a right side member 26 which is a right part (shown on the left side in FIG. 2) of the cowl body 22, and lower edge members 27 which are attached to bottom-front portions of the left side member 25 and the right side member 26, respectively.

As shown in FIG. 1, the front member 23, the top member 24, and a headlamp 35 which is attached between them together cover a front, central region, that is, a region in front of the head pipe 4, of the motorcycle 1. The left side member 25 (see FIG. 3) covers a left-front region of the motorcycle 1 that is a region on the left of the head pipe 4. The right side member 26 covers a right-front region of the motorcycle 1 that is a region on the right of the head pipe 4. The left side member 25 and the right side member 26 extend to side bottom-front regions of the motorcycle 1 and covers the radiator 11 from the sides.

As shown in FIG. 2, a wind screen 31 is attached to a top portion of the top member 24. The cowl body 22 is formed with a headlamp attachment portion 32 at a front-center position. The top member 24 are formed with mirror attachment portions 33 at left and right positions. The left side member 25 and the right side member 26 are formed with respective blinker attachment portions 34. As shown in FIG. 1, the headlamp 35 is attached to the headlamp attachment portion 32, rear-view mirrors 36 are attached to the respective mirror attachment portions 33, and blinkers 37 are attached to the respective blinker attachment portions 34.

As shown in FIG. 3, lower air passage holes 38 are formed through the left side member 25 and the right side member 26 at low positions, respectively. The lower air passage holes 38 are disposed beside the radiator 11 and the engine 3 and between them in the vehicle left-right direction. Riding winds that have passed the radiator 11 flow through the lower air passage holes 38 and are thereby ejected from the cowl body 22.

As shown in FIG. 4, in the cowl body 22, the front member 23, the top member 24, the left side member 25, the right side member 26, and the left and right lower edge members 27 are independent members. The front member 23 is composed of an outer member 41 and two inner members 42. The individual members are formed by resin molding, for example.

For example, the cowl body 22 is assembled in the following manner. First, the front member 23 is formed by fixing the inner members 42 to the outer member 41 with screws, for example. Subsequently, the lower edge members 27 are fixed to the left side member 25 and the right side member 26 with screws, for example, then the left side member 25 and the right side member 26 are fixed to the front member 23 with screws, for example, and finally the top member 24 is fixed to the front member 23, the left side member 25, and the right side member 26 with screws, for example. That is, the fundamental part of the cowl body 22 is divided into the left side member 25 and the right side member 26, and the cowl body 22 is assembled by connecting the left side member 25 and the right side member 26 by the front member 23 which is located below the headlamp 35 and is a tip member of the cowl body 22 and the top member 24 which is located above the headlamp 35. The wind screen 31 is fixed to the top of the thus-assembled cowl body 22 with screws, for example.

As shown in FIG. 5, in an approximately horizontal sectional view, the outer member 41 of the front member 23 assumes an arc shape that extends from a front-center position of the motorcycle 1 toward the rear-left side and the rear-right side in such a manner that the horizontal distance between the left-hand portion and the right-hand portion increases gently as the position goes rearward. More specifically, the outer member 41 has, as a front, central portion, a projection portion 43 which projects forward. A curved portion 44 extends from a position near the projection portion 43 toward the rear-left side (top-right side in FIG. 5) so as to be convex outward, and a curved portion 45 extends from a position near the projection portion 43 toward the rear-right side (top-left side in FIG. 5) so as to be convex outward.

As shown in FIG. 2, the front member 23 is formed with a passage forming portion 47 which extends from a position, near the front, central (in the left-right direction) position, of the front member 23 to a left position. And the front member 23 is formed with a passage forming portion 48 which extends from a position, near the front-center position, of the front member 23 to a right position.

As shown in FIG. 3, the left-hand passage forming portion 47 forms an air passage 51 which extends from the position, near the front-center position, of the front member 23 to its left position. An inlet 52 of the air passage 51 is formed through the front member 23 in its portion near the front-center position so as to face the side in front of the cowl body 22. That is, the inlet 52 of the air passage 51 is formed in the portion, near the front-center position, of the front member 23 and takes in a riding wind coming directly from the front side and a riding wind that flows alongside the cowl body 22. An outlet 53 of the air passage 51 is formed through the front member 23 in its left portion so as to face the side on the front-left of the cowl body 22. That is, the outlet 53 of the air passage 51 is formed in the left side portion (that forms an angle of 45° or less with the vehicle front-rear direction) of the front member 23 and causes a riding wind taken in through the inlet 52 to flow out strongly rear-leftward (more specifically, upward to some extent).

As shown in FIGS. 4 and 5, in the passage forming portion 47, the inner member 42 is attached to the outer member 41 from inside and the outer member 41 and the inner member 42 thereby form the air passage 51. As shown in FIG. 6, the inner member 42 has a sectional shape that is like an approximately-U-shaped gutter that is convex toward the vehicle center side. As shown in FIG. 5, the inner member 42 covers, from inside, a portion of the outer member 41 from a position near its front, central (in the left-right direction) position to a left position. That is, the inner member 42 covers, from inside, the inlet 52, the outlet 53, and the portion, located between them, of the outer member 41 and thus serves to form the air passage 51 which connects the inlet 52 and the outlet 53. A cylindrical or tubular space is thus defined as the air passage 51 by the outer member 41 and the inner member 42. The portion, between the inlet 52 and the outlet 53, of the air passage 51 has a closed cross section. The inlet 52 and the outlet 53 are the two ends of the air passage 51.

As shown in FIG. 5, in a sectional view taken parallel with the air passage 51 which is a little inclined from a horizontal plane, the air passage 51 of the passage forming portion 47 is inclined so as to be more distant from a reference line A-A (that forms a vertical plane with the center line, in the left-right direction, of the motorcycle 1) as the position goes rearward. As shown in FIG. 5, the outer member 41 and the inner member 42 serve as an outer wall and an inner wall of the air passage 51, respectively. In the portion of the air passage 51 between the inlet 52 and the outlet 53, in FIG. 5 the outer wall of the air passage 51 is larger in curvature and swells outward more than its inner wall.

Furthermore, as shown in FIG. 5, the passage forming portion 47 has a narrowing portion 54 in which the sectional area of the air passage 51 decrease as the position goes from the inlet 52 to the outlet 53. The narrowing portion 54 is formed by portions, near the outlet 53, of the outer member 41 and the inner member 42. The opening area of the outlet 52 is smaller than that of the inlet 53. The sectional area, taken perpendicularly to an air flow, of the air passage 51, is smaller in the vicinity of the outlet 53 than in the vicinity of the inlet 52.

As shown in FIG. 3, the outlet 53 of the air passage 51 is located above its inlet 52 and in the vehicle side view the air passage 51 is inclined so as to be higher as the position goes rearward. In the side view, the air passage 51 extends straightly along the straight line B-B.

As shown in FIG. 5, the air passage 51 is formed inside the cowl body 22. The inlet 52 and the outlet 53 of the air passage 51 are formed in the curved portion 44 of the outer member 41. More specifically, the inlet 52 is formed in a front portion of the curved portion 44 (i.e., a portion near the projection portion 43 of the outer member 41) and the outlet 53 is formed in a rear portion of the curved portion 44 (i.e., a side portion of the outer member 41). As shown in FIG. 1, the inlet 52, the outlet 53, and the intermediate portion between them of the air passage 51 are located in front of the head pipe 4 of the motorcycle 1, above the radiator 11, and below the meter unit 10.

The right-hand passage forming portion 48 of the front member 23 is left-right symmetrical with its left-hand passage forming portion 47, and an inlet 52 and an outlet 53 of an air passage 51 of the right-hand passage forming portion 48 are formed in a curved portion 45 of the outer member 41 of the front member 23. The right-hand passage forming portion 48 is formed in the same manner as the above-described left-hand passage forming portion 47 except that they are disposed on the right side and the left side, respectively.

Figure 7:
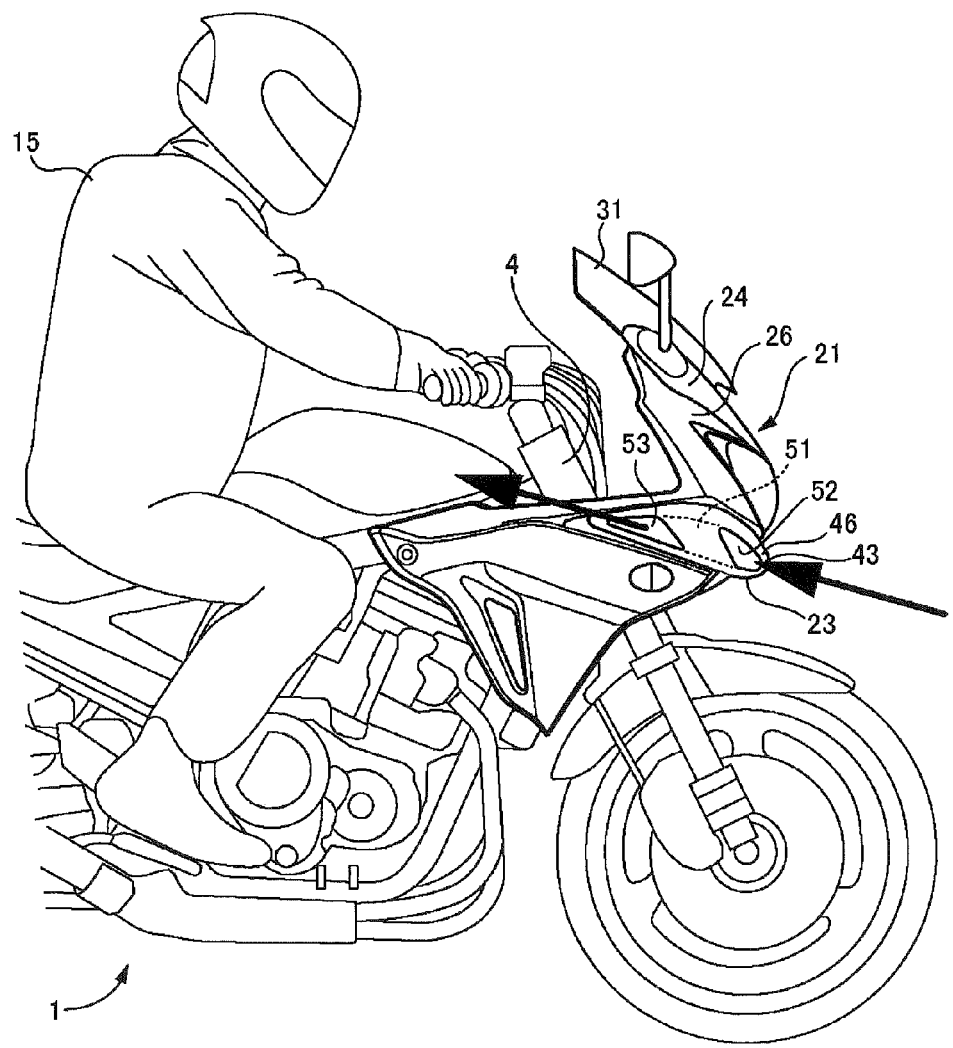
FIG. 7 illustrates how the cowl according to the first embodiment works.
Figure 8:
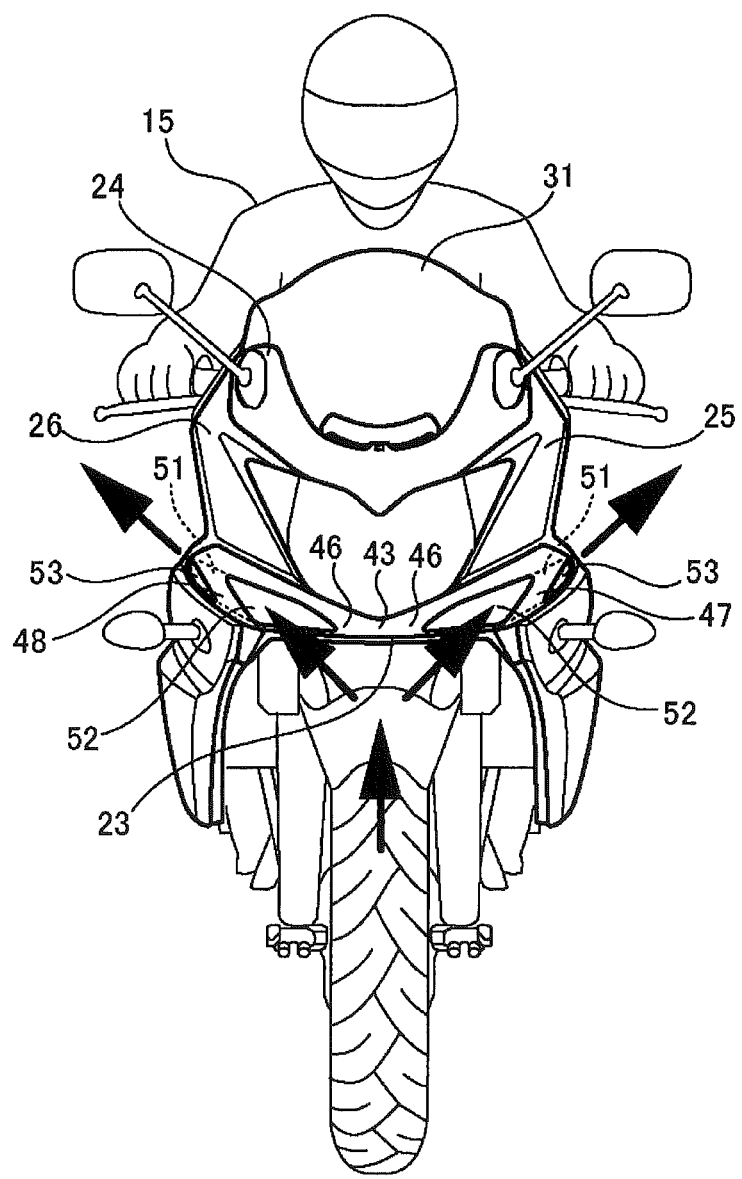
FIG. 8 also illustrates how the cowl according to the first embodiment works.
Figure 9:
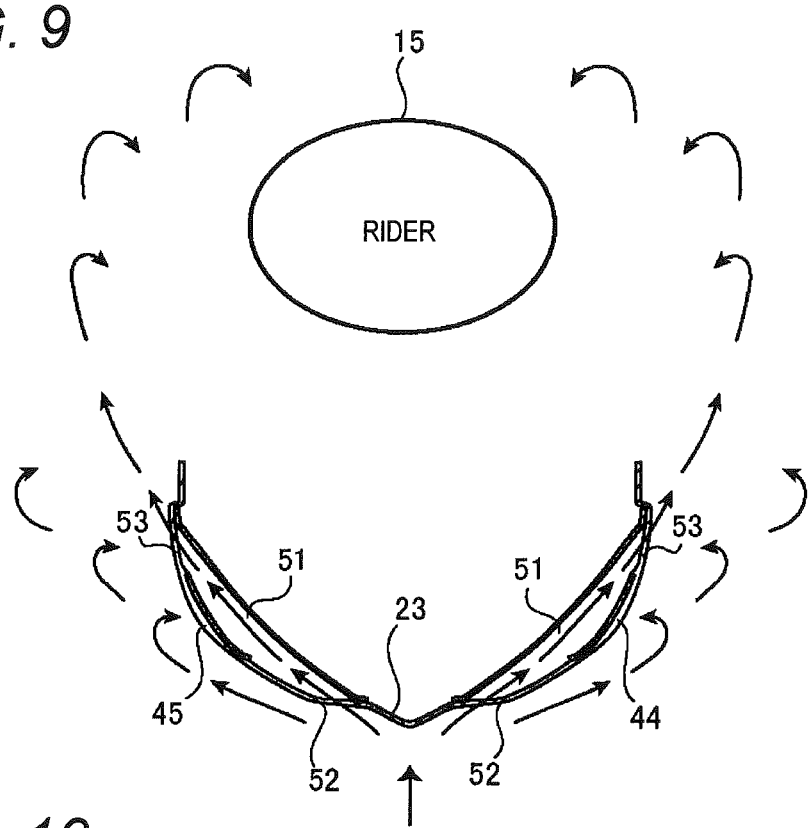
FIG. 9 illustrates how a riding wind flows in the cowl according to the first embodiment
Figure 10:
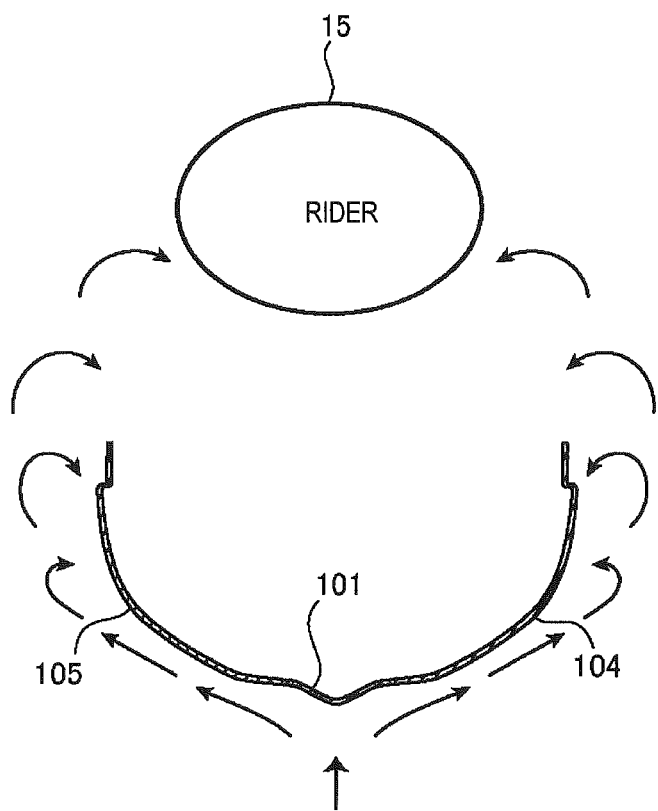
FIG. 10 shows a riding wind flows in another cowl.

FIGS. 7 and 8 show flow directions of air that flows through the air passages 51 of the cowl 21. FIG. 9 shows air flow directions outside the cowl 21 and in the air passages 51. FIG. 10 shows air flows outside another cowl 101 that does not have the air passages 51.

A riding wind occurs when the motorcycle 1 runs, and front portions of the cowl 21 receive the riding wind. The region of the cowl 21 that receives a riding wind at a highest pressure is a front region around the front-center position where the cowl 21 projects forward (this region is also a front end region of the motorcycle 1). The projection portion 43 of the outer member 41 of the front member 23 is in the vicinity of the front-center position of the cowl 21, and the pressure of a riding wind is high in front of the projection portion 43.

After hitting the projection portion 43, a riding wind flows rearward alongside the outer surfaces of portions, located around the projection portion 43, of the cowl 21. After hitting the projection portion 43, parts of the riding wind flow rearward from the projection portion 43 alongside the outer surfaces of the front member 23, the left side member 25, the right side member 26, the top member 24, and the wind screen 31. As indicated by arrows in FIGS. 7 and 8, the other parts of the riding wind flow from the projection portion 43 toward the inlets 52 of the air passages 51 and are received by side intermediate portions of the air passages 51 (each side intermediate portion is located between the inlet 52 and the outlet 53 of the outer member 41). These parts of the riding wind are redirected by the side intermediate portions are combined with other riding winds that comes from the vehicle front side and flow into the inlets 52 directly, and the combined winds flow through the air passages 51 and are ejected from the outlets 53. The side intermediate portions each of which is located between the inlet 52 and the outlet 53 of the outer member 41 are located adjacent to (i.e., partially defined by) the curved portions 44 and 45, respectively.

The inlet 52 of each air passage 51 is formed in a portion that is connected, by a gentle wall, to a front, central tip region, to receive a riding wind at a high pressure, of the cowl 21 or a front tip portion of the cowl 21. Therefore, a larger amount of riding wind can flow into each inlet 52 than an inlet that is distant from the front-center position a cowl (e.g., the inlet (located in the side portion) of the cowl disclosed in JP-A-2012-162094). And the flow speed of a riding wind flowing into the inlet 52 can be made higher. As a result, the pressure of a riding wind hitting the front portion of the cowl 21 can be lowered and hence the air drag (running resistance) can be reduced.

In particular, the outer member 41 of the front member 23 has, between the projection portion 43 and the inlets 52, slant surfaces 46 that are inclined gently rear-leftward and rear-rightward toward the inlets 52, respectively. After hitting the projection portion 43, a high-pressure riding wind flows alongside the slant surfaces 46 and reaches the inlets 52. Since the inlets 52 are disposed near the projection portion 43 and the slant surfaces 46 are formed between the projection portion 43 and the respective inlets 52, a high-pressure riding wind hitting the projection portion 43 can be guided to the inlets 52 smoothly and the amount and flow speed of riding wind flowing into each inlet 52 can be increased. These enhance the effect of reducing the air drag of the cowl 21.

Since each air passage 51 is inclined sideways with respect to the reference line A-A shown in FIG. 5, it can guide a riding wind flowing into it through the associated inlet 52 to beside the cowl 21. In each air passage 51, a riding wind flows alongside the inner wall (inner member 42) of the air passage 51 that has a smaller curvature than its outer wall (outer member 41) and hence comes to flow in a direction that is closer to the vehicle front-rear direction. Therefore, the resistance to the riding wind flowing through the air passage 51 can be reduced. As a result, a riding wind can be caused to flow smoothly to beside the cowl 21 and the air resistance of the cowl 21 can be reduced.

In a vehicle side view, each air passage 51 extends straightly along a straight line B-B shown in FIG. 3 which inclines rear-side up. Therefore, each air passage 51 can cause a riding wind flowing into it to flow out of its outlet 53 toward a position that is approximately the same in height as the belly (i.e., the part above the waist and below the armpits; located in the top-rear of the front member 23) of the rider 15.

As shown in FIG. 8, a riding wind that has passed each air passage 51 flows out of the cowl 21 from the outlet 53. Since each outlet 53 is directed to beside the cowl 21, a riding wind that has flown through the air passage 51 can be caused to flow to beside the cowl 21 from the outlet 53. As shown in FIG. 7, a riding wind that has flown through each air passage 51 flows out of the cowl 21 leftward or right ward at a position in front of the head pipe of the motorcycle 1. Furthermore, as shown in FIG. 5, each air passage 51 has the narrowing portion 54 where the sectional area of the air passage 51 decreases as the position goes closer to the outlet 53. This makes it possible to increase the flow speed of a riding wind flowing out of the outlet 53.

As described above, part of a riding wind is brought into each air passage 51 and ejected outward (to beside the cowl 21) from a position that is approximately the same in height as the waist of the rider 15 toward a position that is approximately the same in height as his or her belly (located in the top-rear of the front member 23). As a result, as shown in FIG. 9, formation of vortices (turbulences) beside the cowl 21 can be suppressed. Even if vortices are formed beside the cowl 21, they can be blown away (i.e., changed in flowing directions) by a riding wind flowing out of the outlets 53 and thereby moved away from the cowl 21. As a result, the vortices of the riding wind can be prevented from hitting the belly of the rider 15.

Now, the cowl 21 (see FIG. 9) according to the first embodiment of the invention which has the air passages 51 is compared with another cowl 101 (see FIG. 10) that does not have the air passages 51 in terms of how a riding wind flows. FIGS. 9 and 10 are sectional views taken by a plane including the straight line B-B shown in FIG. 3 along which each air passage 51 extends (each air passage 51 is inclined rear-side up in a vehicle side view). Air flow directions are indicated by arrows in FIGS. 9 and 10.

As shown in FIG. 10, in the cowl 101 not having the air passages 51, a riding wind hitting the front surface of the cowl 101 is split into left and right side winds that flow alongside the front surface of the cowl 101 toward its side surfaces. The side winds go off the cowl 101 at curved portions 104 and 105 each of which connects the front surface and the side surface (i.e., the rear portion of the cowl 101 that forms approximately an angle of 45° or less with the vehicle front-rear direction) or encounter a similar phenomenon, whereby vertices are formed beside the cowl 101. The vertices turn inward behind the cowl 101 to go into the region that is narrower than the cowl 101, and many of the vortices hit the belly of the rider 15. The phenomenon that winds turn inward to go into the region that is narrower than the cowl 101 is made more remarkable by the generation of vortices, and vortices are more prone to occur as the difference between the angles of the front surface and the side surfaces increases.

On the other hand, as shown in FIG. 9, in the cowl 21 according to the first embodiment of the invention which has the air passages 51 on the back sides of the curved portions 44 and 45 which connect the front surface and the side surfaces of the cowl 21, although a riding wind hitting the front surface of the cowl 21 is split into left and right side winds that flow alongside the front surface of the cowl 21 toward its side surfaces, the side winds flow through the inlets 52 formed in the front surface of the cowl 21 and flow through the air passages 51 which are located on the back sides of the curved portions 44 and 45 connecting the front surface and the side surfaces of the cowl 21. Therefore, disordering of side winds such as going off the cowl 21 and formation of vortices beside the cowl 21 can be suppressed that would otherwise occur due to the shapes of the curved portions 44 and 45 which connect the front surface and the side surfaces (i.e., the rear portions of the cowl 101 that form approximately an angle of 45° or less with the vehicle front-rear direction).

Although vortices are formed beside the cowl 21 in places other than the vicinities of the air passage 51, they are blown away rear-leftward or rear-rightward (to outside the width of the cowl 21 in the vehicle left-right direction) by riding winds that have been direction-adjusted and increased in speed as a result of passage through the air passages 51 and flow out of the outlets 53. Therefore, many of the vortices do not hit the belly of the rider 15.

As shown in FIG. 9, in the cowl 21 according to the first embodiment of the invention which has the air passages 51, although vortices of a riding wind may be formed in the rear of the cowl 21, they are carried to behind the rider 15 and hence many of them do not hit the belly of the rider 15.

As described above, in the cowl 21 according to the first embodiment of the invention, a large amount of high-pressure riding wind occurring in front of the cowl 21 can be guided smoothly to beside the cowl 21 by means of the air passages 51. Therefore, even if the cowl 21 is increased in size, the pressure in front of the cowl 21 can be reduced and increase of the air resistance (running resistance) can be suppressed.

A riding wind can be ejected to beside the cowl 21 from the outlets 53 from positions that are approximately the same in height as the waist of the rider 15 toward positions that are distant from the vehicle center line and approximately the same in height as his or her belly (i.e., the part above the waist and below the armpits; located in the top-rear of the front member 23) of the rider 15. As a result, winds flowing out of the outlets 53 interact with winds that have been disordered as a result of passage alongside the cowl 21 and occupy a wide vertical range, whereby winds that hit the belly of the rider 15 can be weakened.

The air passages 51 are disposed adjacent to (i.e., partially defined by) the curved portions 44 and 45 of the front member 23 which is the front part of the cowl 21; in other words, the air passages 51 are disposed inside the cowl 21, in front of the head pipe 4, above the radiator 11, and below the meter unit 10. This secures a high degree of freedom of designing of the cowl 21.

More specifically, forming the air passages 51 adjacent to the curved portions 44 and 45 of the front member 23 of the cowl 21 makes it possible to degradation of the design and to utilize the air passages 51 themselves for improvement of the design. Disposing the air passages 51 inside the cowl 21 makes it possible to avoid formation of large undulations in the outer surfaces of the cowl 21 and to thereby produce a good design. In many motorcycles, a large unused space exists between the radiator and the meter unit. Therefore, disposing the air passages 51 between the radiator 11 and the meter unit 10 makes it possible to utilize this large unused space effectively and to thereby add the air passages 51 without changing the existing cowl design to a large extent.

Figure 11:
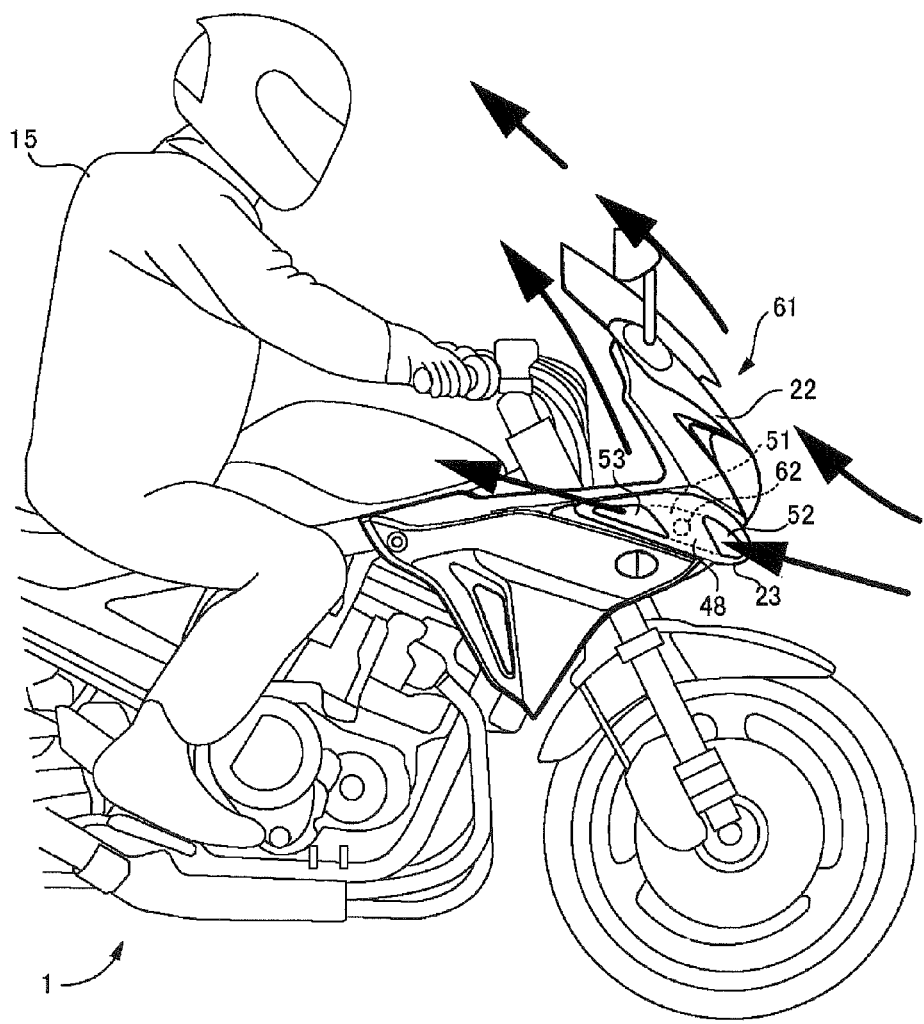
FIG. 11 shows a motorcycle that is equipped with a cowl according to a second embodiment of the invention.
Figure 12:
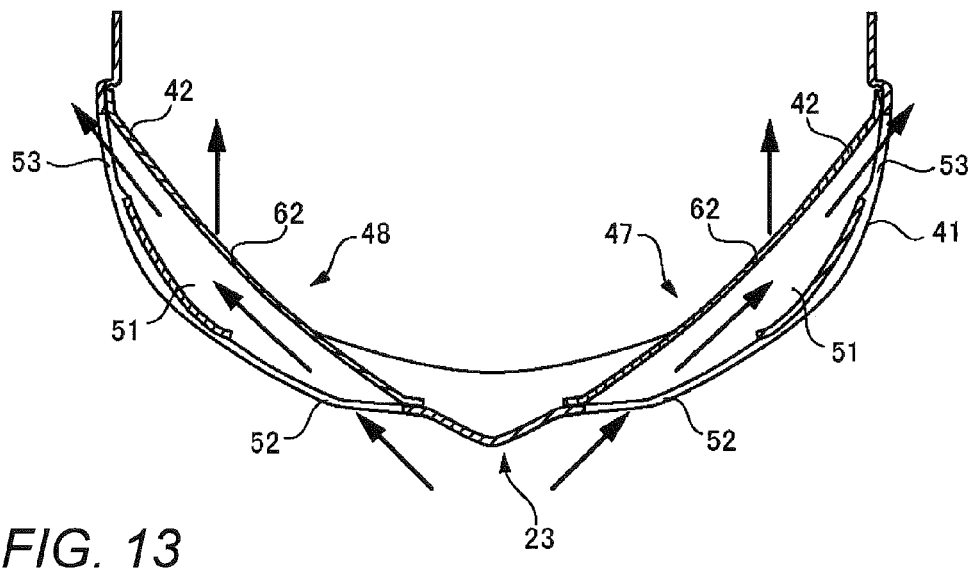
FIG. 12 is a sectional view of a front member of the cowl according to the second embodiment.

FIG. 11 shows a front part of a motorcycle that is equipped with a cowl 61 according to a second embodiment of the invention. FIG. 12 shows a front member 23 of the cowl 61 according to the second embodiment of the invention shown in FIG. 11. Constituent elements shown in FIGS. 11 and 12 having (approximately) the same ones in the cowl 21 according to the first embodiment of the invention are given the same reference symbols as the latter, and descriptions therefor will be omitted.

As shown in FIG. 12, in the front member 23 of the cowl 61 according to the second embodiment of the invention, each of passage forming portions 47 and 48 is formed with a hole 62 for letting an intermediate portion of the air passage 51 communicate with the inside of the cowl body 22. The hole 62 is formed (penetrates) through an inner member 42 at a position corresponding to the intermediate portion of the air passage 51. More specifically, the hole 62 is formed at the starting position of the narrowing portion 54 as a bottom hole of the inner member 42 having an approximately U-shaped cross section that is convex toward the vehicle center. Thus, the hole 62 is formed so as to communicate with the inside of the cowl body 22 at a position where a relatively high pressure occurs.

Since the holes 62 are formed at the intermediate portions of the respective air passages 51, as indicated by arrows in FIGS. 11 and 12, parts of riding winds flowing into the air passages 51 go into the inside of the cowl body 22 through the holes 62. This prevents a phenomenon that a negative pressure occurs inside the cowl body 22 due to riding winds that flow outside the cowl 21 during running of the motorcycle 1. The cowl 61 according to the second embodiment of the invention can prevent a problem of conventional cowls that the head of the rider is attracted by the cowl as the negative pressure inside the cowl increases, which makes the driving of the rider difficult.

Formed in the intermediate portions of the air passages 51, the holes 62 are not exposed from the external surface of the cowl 61, that is, are disposed at such positions as to be hardly seen or not to be seen at all from the outside. This prevents that the design of the cowl 61 is degraded by the formation of the holes 62.

Figure 13:
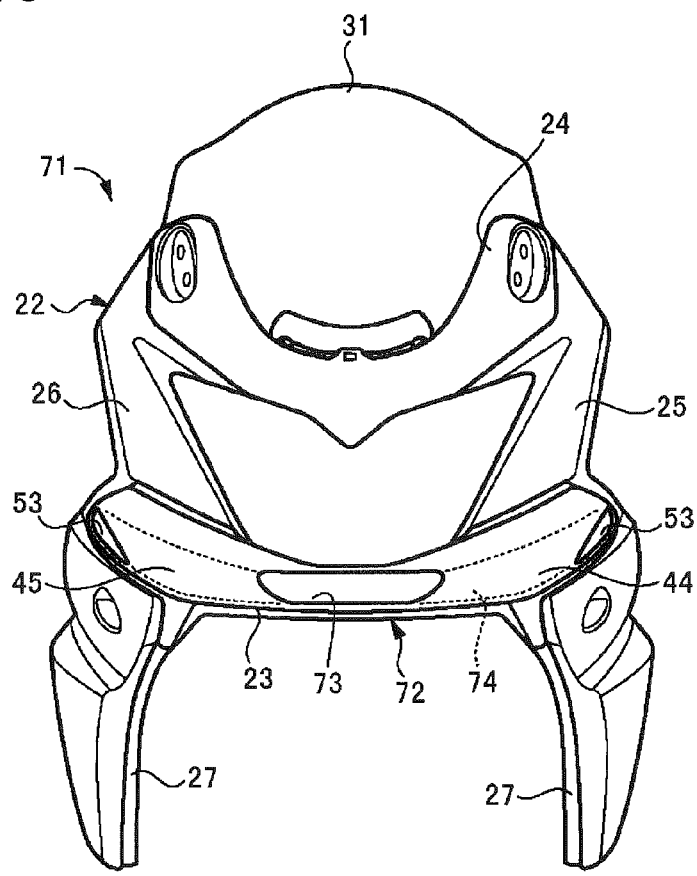
FIG. 13 shows a cowl according to a modification of each of the embodiments.

In each of the above embodiments, the two inlets 52 are formed in the portion, near the front, central (in the left-right direction) position, of the front member 23 and the left and right air passages 51 communicate with the respective inlets 52. However, the invention is not limited to such a configuration. For example, FIG. 13 shows a cowl 71 according to a modification in which one inlet 73 is formed through a front member 72 at a front, central (in the left-right direction) and air passages 74 are formed so as to connect the one inlet 73 to the left and right outlets 53. In this case, the tip portions of the cowl 71 are portions over and under the inlet 73 or a circumferential portion of the inlet 73. The shapes of the inner members are changed so as to conform to the shapes of air passages 74, respectively. This configuration makes it possible to efficiently introduce, into the air passages 74, a high-pressure riding wind that hits the front, central portion of the cowl 71.

Figure 14:
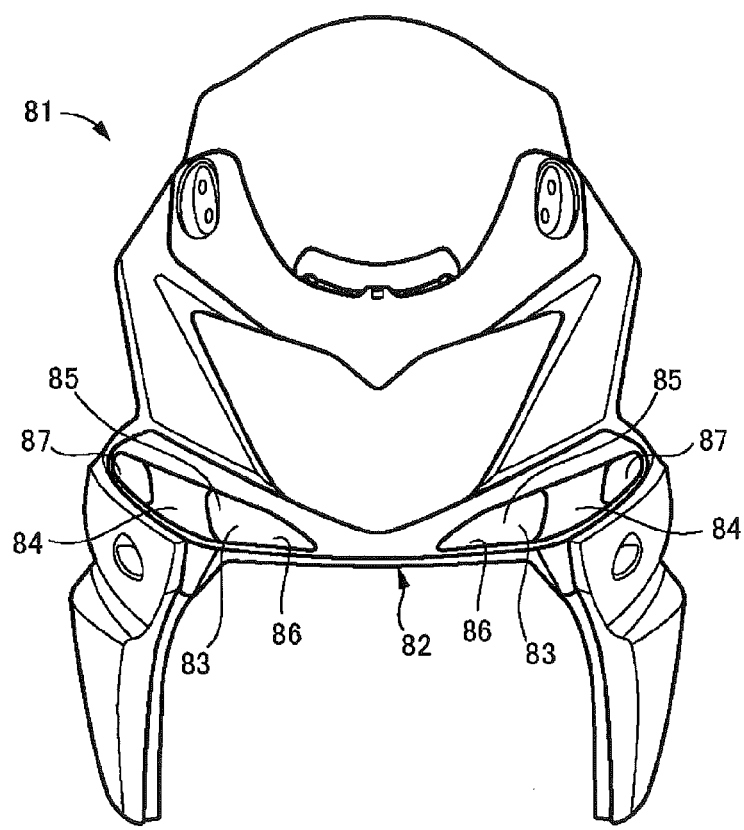
FIG. 14 shows a cowl according to another modification of each of the embodiments.

In each of the above embodiments, the front member 23 has the outer member 41 and the inner members 42, the inlet 52 and the outlets 53 are formed through the outer member 41, and the air passages 51 are formed by attaching the inner members 42 to the outer member 43 from inside so as to cover the inlets 52 and the outlets 53. However, the invention is not limited to such a configuration. For example, FIG. 14 shows a cowl 81 according to another modification in which a front member 82 is formed with recesses 83 from positions near the front, central (in the left-right direction) position of the front member 23 to side positions and air passages 85 are formed by closing intermediate portions of the recesses 83 by attaching cover plates 84 to the recesses 83 from outside. In this case, two portions, not covered with the cover plate 84, of each recess are made an inlet 86 and an outlet 87.

Alternatively, a cover plate 84 having two holes may be attached so as to cover each opening 83 fully except for its portions that are opposed to the respective holes. The holes are made an inlet 86 and an outlet 87. Another alternative is possible in which a recess extends so as to be formed also in a portion of each of the left side member 25 and the right side member 26 and an air passage is formed by attaching a cover plate to the recess from outside.

Figure 15:
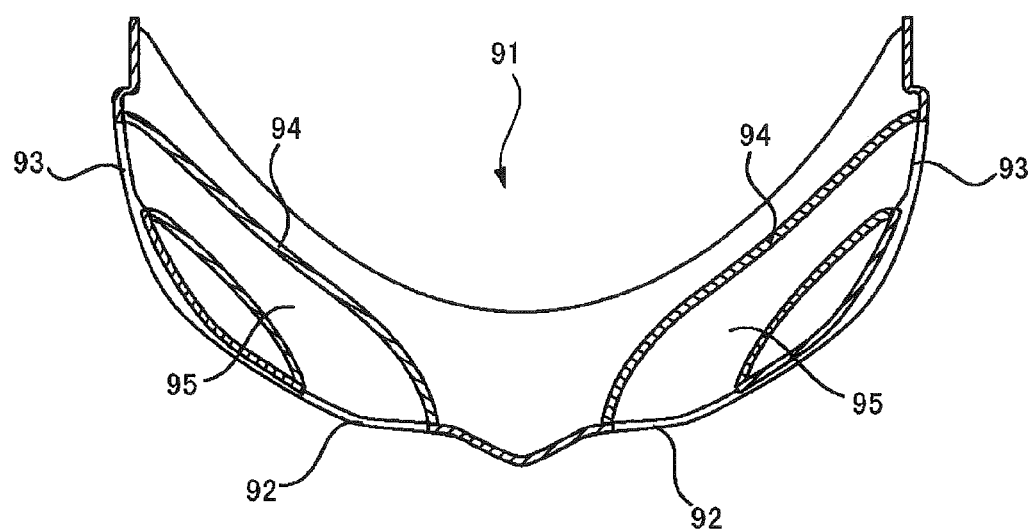
FIG. 15 shows a cowl according to still another modification of each of the embodiments.

FIG. 15 shows a cowl body 91 according to still another modification which is formed with inlets 92 and outlets 93. Each air passage 95 is formed by forming a separate, pipe-shaped passage member 94 inside the cowl body 91 so as to connect the inlet 92 and the outlet 93.

In each of the above embodiments, as shown in FIG. 4, the cowl body 22 is formed by assembling the independent parts such as the front member 23, the top member 24, the left side member 25, and the right side member 26. However, the invention is not limited to such a configuration. For example, the front member 23, the top member 24, the left side member 25, and the right side member 26 may be molded as an integral member.

The invention can be applied to not only half cowls but also full cowls. Furthermore, the invention can also be applied to scooters, tricycles, buggies, etc.

Various modifications are possible without departing from the spirit and scope of the invention that can be read from the claims and the specification as a whole, and the technical scope of the invention encompasses such modified cowls.

What is claimed is:
1. A cowl which covers a front component of a saddle-ridden type vehicle, comprising:
a cowl body; and
passage forming portions each of which extends from a front, central, in a left-right direction, position of the cowl body or a vicinity of the front, central position to a side position of the cowl body, wherein:
each of the passage forming portions forms an air passage that extends from the front, central position of the cowl body or a vicinity of the front, central position to the side position of the cowl body;
the passage forming portions or each of the passage forming portions has an inlet that is opened at the front, central position of the cowl body or a position near the front, central position so as to face the side in front of the cowl body;
each of the passage forming portions has an outlet that is opened at a side position of the cowl body so as to face the side on rear-left or rear-right of the cowl body; and the air passages cause a riding wind occurring during running of the saddle-ridden type vehicle to flow through the air passages.

2. The cowl according to claim 1, wherein the cowl body has curved portions each of which extends between a front portion or a front edge and a side end portion or side end of the cowl body while being curved so as to be convex outward and partially defines the associated air passage.

3. The cowl according to claim 1, wherein the air passages are inclined with respect to a front-rear reference line, located at the center in the left-right direction, of the saddle-ridden type vehicle in an approximately horizontal sectional view.

4. The cowl according to claim 2, wherein the air passages are inclined with respect to a front-rear reference line, located at the center in the left-right direction, of the saddle-ridden type vehicle in an approximately horizontal sectional view.

5. The cowl according to claim 1, wherein:
the cowl body has, at the front, central position, a projection portion which projects forward;
the inlets are located near the projection portion; and
the cowl body has slant surfaces each of which extends from the projection portion to the inlet and is inclined gently so as to go rearward as the position goes from the projection portion to the inlet.

6. The cowl according to claim 2, wherein:
the cowl body has, at the front, central position, a projection portion which projects forward;
the inlets are located near the projection portion; and
the cowl body has slant surfaces each of which extends from the projection portion to the inlet and is inclined gently so as to go rearward as the position goes from the projection portion to the inlet.

7. The cowl according to claim 3, wherein:
the cowl body has, at the front, central position, a projection portion which projects forward;
the inlets are located near the projection portion; and
the cowl body has slant surfaces each of which extends from the projection portion to the inlet and is inclined gently so as to go rearward as the position goes from the projection portion to the inlet.

8. The cowl according to claim 4, wherein:
the cowl body has, at the front, central position, a projection portion which projects forward;
the inlets are located near the projection portion; and
the cowl body has slant surfaces each of which extends from the projection portion to the inlet and is inclined gently so as to go rearward as the position goes from the projection portion to the inlet.

9. The cowl according to claim 1, wherein the outlets are located higher than the inlets.

10. The cowl according to claim 2, wherein the outlets are located higher than the inlets.

11. The cowl according to claim 3, wherein the outlets are located higher than the inlets.

12. The cowl according to claim 4, wherein the outlets are located higher than the inlets.

13. The cowl according to claim 1, wherein each of the passage forming portions has a narrowing portion which makes the sectional area of the air passage smaller as the position goes from the inlet to the outlet.

14. The cowl according to claim 2, wherein each of the passage forming portions has a narrowing portion which makes the sectional area of the air passage smaller as the position goes from the inlet to the outlet.

15. The cowl according to claim 3, wherein each of the passage forming portions has a narrowing portion which makes the sectional area of the air passage smaller as the position goes from the inlet to the outlet.

16. The cowl according to claim 4, wherein each of the passage forming portions has a narrowing portion which makes the sectional area of the air passage smaller as the position goes from the inlet to the outlet.

17. The cowl according to claim 1, wherein each of the passage forming portions has a hole which causes an intermediate portion of the air passage to communicate with the inside of the cowl body.

18. The cowl according to claim 2, wherein each of the passage forming portions has a hole which causes an intermediate portion of the air passage to communicate with the inside of the cowl body.

19. The cowl according to claim 3, wherein each of the passage forming portions has a hole which causes an intermediate portion of the air passage to communicate with the inside of the cowl body.

20. The cowl according to claim 4, wherein each of the passage forming portions has a hole which causes an intermediate portion of the air passage to communicate with the inside of the cowl body.

* * * * *